UNITED STATES PATENT OFFICE 2,476,546

PRODUCTION OF CHLOROTRIAZINYL-NITRILES

Ingenuin Hechenbleikner, Stamford, Conn., assignor to American Cyanamid Company, New York, N. Y., a corporation of Maine No Drawing. Application January 13, 1945, Serial No. 572,753

11 Claims. (Cl. 260—249.5)

This invention relates to new and useful triazines, and more particularly to the production of new cyanoalkylaminochlorotriazines.

The cyanoalkylaminochlorotriazines of this invention may be represented by the formula

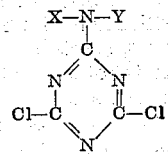

where X is chosen from the group consisting of hydrogen, alkyl, cycloalkyl, aryl, and cyanoalkyl, and Y is cyanoalkyl.

Illustrative examples of the X, and Y groups which have the meanings above given are:

For cyanoalkyl: cyanomethyl, β-cyanoethyl, γ-cyanopropyl, β-cyano-α-methylethyl, etc.
For alkyl: methyl, ethyl, propyl, isopropyl, butyl, allyl, hexyl, dodecyl, etc.
For cycloalkyl: cyclohexyl, cyclohexenyl, cyclopentyl, cycloheptyl, etc.
For aryl: phenyl, diphenyl, naphthyl, tolyl, xylyl, etc.

These cyanoalkylaminochlorotriazines are prepared by reacting an aminonitrile of the formula

where X and Y have the meanings above given, with cyanuric chloride, which has the formula

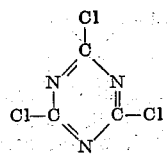

These cyanoalkylaminochlorotriazines may be prepared in a number of liquid media, and it is not necessary that the chlorotriazine for the reaction be completely in solution. However, if undissolved chlorotriazine is in suspension it is desirable to have the solid in a finely divided state so as to be more easily available for reaction.

In the preparation of the cyanoalkylaminochlorotriazines, hydrogen chloride is split off and must be removed from the reaction. This is accomplished by adding HCl-acceptors which include such materials as an excess of the amine used in the reaction, sodium bicarbonate, and sodium hydroxide. Other HCl-acceptors may be used with equal success, but for the sake of economy and easy availability the above are preferred.

The cyanoalkylaminochlorotriazines herein described are useful in manufacture of chemical intermediates, chemotherapeutic agents, dyes, insecticides, synthetic resins, plastics, and other materials in which substituted triazines carrying cyanoalkylamino groups are desirable. The following examples will illustrate the preparation of typical cyanoalkylaminochlorotriazine materials herein described.

EXAMPLE 1

*Preparation of 2,4-dichloro-6-cyanomethylamino-1,3,5-triazine*

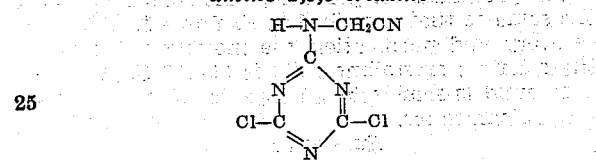

| Reactants | Molar Ratio |
|---|---|
| Cyanuric chloride | 1.0 |
| Acetone | 13.5 |
| Glycinonitrile | 1.0 |
| Sodium bicarbonate | 1.0 |
| Water | 11.0 |

The cyanuric chloride is dissolved in acetone and the solution cooled to 0–5° C. The aminonitrile is added slowly to the cyanuric chloride solution to keep the temperature at 0–5° C. When this addition is complete, the aqueous suspension of sodium bicarbonate is added slowly while the temperature is kept below 5° C. Carbon dioxide is evolved during the addition of the sodium bicarbonate. The solution becomes clear and it is stirred for 2 hours at 0° C. The reaction mixture is diluted with approximately an equal volume of water to precipitate the desired dichlorotriazine. After recovery and purification the colorless crystalline solid melts at 178–180° C. This compound has an irritating odor, and it is soluble in acetone, benzene, and hot water, but insoluble in hexane.

EXAMPLE 2

Preparation of 2,4-dichloro-6-di-β-cyanoethyl-amino-1,3,5-triazine

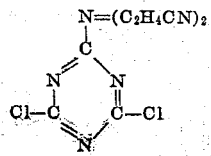

| Reactants | Molar Ratio |
|---|---|
| Cyanuric chloride | 1.0 |
| Acetone | 13.5 |
| Iminodipropionitrile | 1.0 |
| Sodium bicarbonate | 1.0 |
| Water | 42.0 |

The procedure for preparing this compound is the same as described in Example 1. After recovery and purification the melting point of the colorless, odorless, crystalline solid is 212–215° C. This compound is soluble in hot naphtha, alcohol, and benzene, but insoluble in water.

EXAMPLE 3

Preparation of 2-butylcyanomethylamino-4,6-dichloro-1,3,5-triazine

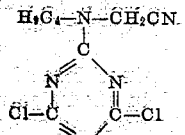

| Reactants | Molar Ratio |
|---|---|
| Cyanuric chloride | 1.0 |
| Acetone | 13.5 |
| Butylaminoacetonitrile | 1.0 |
| Sodium bicarbonate | 1.0 |
| Water | 42.0 |

The procedure for preparing this compound is the same as that described in Example 1. After recovery and purification the melting point of the colorless crystalline solid is 80–81° C. This compound is soluble in all organic solvents, but insoluble in water.

EXAMPLE 4

Preparation of 2,4-dichloro-6-cyclohexylcyanomethylamino-1,3,5-triazine

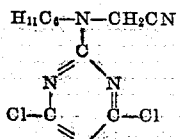

| Reactants | Molar Ratio |
|---|---|
| Cyanuric chloride | 1.0 |
| Acetone | 6.8 |
| Cyclohexylaminoacetonitrile | 1.0 |
| Sodium hydroxide | 1.0 |
| Water | 7.0 |

The aminonitrile is added to the acetone solution of the cyanuric chloride at a rate so that a temperature range of 30–35° C. is maintained. After the addition of the aminonitrile is complete, the aqueous sodium hydroxide is added slowly at the same temperature range in order to dissolve the hydrochloride of the aminonitrile and cause the reaction to go the completion. After the reaction mixture is diluted with a large volume of water, the desired triazine precipitates. After recovery and purification, the colorless, odorless, crystalline solid melts at 145–146° C. This compound is soluble in most organic solvents, but insoluble in water.

EXAMPLE 5

Preparation of 2,4-dichloro-6-phenylcyanomethylamino-1,3,5-triazine

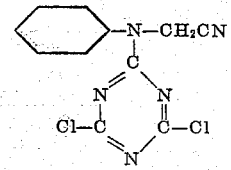

| Reactants | Molar Ratio |
|---|---|
| Cyanuric chloride | 1.0 |
| Acetone | 10.0 |
| Phenylaminoacetonitrile | 1.0 |
| Sodium bicarbonate | 1.0 |
| Water | 7.0 |

The procedure for preparing this compound is the same as that described in Example 1. After recovery and purification the melting point of the colorless, odorless, crystalline solid is 152–154° C. This compound is soluble in alcohol and benzene, but insoluble in water.

While the invention has been described with particular reference to specific embodiments, it is to be understood that it is not to be limited thereto but is to be construed broadly and restricted solely by the scope of the appended claims.

What is claimed:

1. A compound of the formula

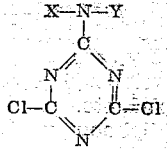

where X is chosen from the group consisting of hydrogen, alkyl, cycloalkyl, aryl, and cyanoalkyl, and Y is cyanoalkyl.

2. A method of preparing a compound of the formula

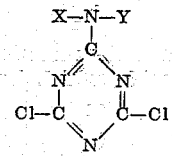

where X is chosen from the group consisting of hydrogen, alkyl, cycloalkyl, aryl, and cyanoalkyl, and Y is cyanoalkyl, which comprises reacting cyanuric chloride with an amine of the formula

where X and Y have the meanings above given, and recovering the substituted 1,3,5-triazine obtained.

3. 2,4-dichloro-6-cyanomethylamino-1,3,5-triazine of the formula:

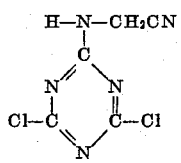

4. A method of preparing 2,4-dichloro-6-cyanomethylamino-1,3,5-triazine which comprises reacting glycinonitrile with cyanuric chloride, and recovering the 2,4-dichloro-6-cyanomethylamino-1,3,5-triazine obtained.

5. A method of preparing 2,4-dichloro-6-cyanomethylamino-1,3,5-triazine which comprises reacting glycinonitrile with an aqueous acetone solution of cyanuric chloride at a temperature below 35° C., and recovering the 2,4-dichloro-6-cyanomethylamino-1,3,5-triazine obtained.

6. 2,4-dichloro-6-di-$\beta$-cyanoethylamino-1,3,5-triazine of the formula:

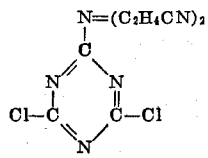

7. A method of preparing 2,4-dichloro-6-di-$\beta$-cyanoethylamino-1,3,5-triazine which comprises reacting iminodipropionitrile with cyanuric chloride, and recovering the 2,4-dichloro-6-di-$\beta$-cyanoethylamino-1,3,5-triazine obtained.

8. A method of preparing 2,4-dichloro-6-di-$\beta$-cyanoethylamino-1,3,5-triazine which comprises reacting iminodipropionitrile with an aqueous acetone solution of cyanuric chloride at a temperature below 35° C., and recovering the 2,4-dichloro-6-di-$\beta$-cyanoethylamino-1,3,5-triazine obtained.

9. 2,4-dichloro-6-phenylcyanomethylamino-1,3,5-triazine of the formula:

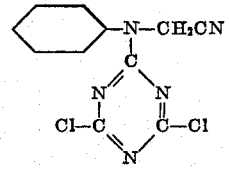

10. A method of preparing 2,4-dichloro-6-phenylcyanomethylamino-1,3,5-triazine which comprises reacting phenylaminoacetonitrile with cyanuric chloride, and recovering the 2,4-dichloro-6-phenylcyanomethylamino-1,3,5-triazine obtained.

11. A method of preparing 2,4-dichloro-6-phenylcyanomethylamino-1,3,5-triazine which comprises reacting phenylaminoacetonitrile with an aqueous acetone solution of cyanuric chloride at a temperature below 35° C., and recovering the 2,4-dichloro-6-phenylcyanomethylamino-1,3,5-triazine obtained.

INGENUIN HECHENBLEIKNER.

REFERENCES CITED

The following references are of record in the file of this patent:

Chem. Abstracts, vol. 31, p. 1010.
Compte Rendue, vol. 203 (1936), pp. 568–70.